United States Patent [19]

Oka et al.

[11] 4,003,588
[45] Jan. 18, 1977

[54] INFLATABLE PROTECTOR BAG OR VEHICLE SAFETY DEVICE

[75] Inventors: Takashi Oka, Tokyo; Syuichi Suzuki; Hilokazu Mitsuhashi, both of Yokohama; Hiroshi Iwasaki, Kamakura, all of Japan

[73] Assignees: Nissan Motor Co., Ltd.; Ikeda Bussan Company, Limited, both of Japan

[22] Filed: June 26, 1975

[21] Appl. No.: 590,496

[30] Foreign Application Priority Data

July 2, 1974 Japan .................. 49-75563

[52] U.S. Cl. .................. 280/743; 93/35 PT; 139/389; 150/1; 206/.6
[51] Int. Cl.² .................. B60R 21/08
[58] Field of Search ........ 280/743; 206/.6, 522; 150/1; 93/35 PT, 35 SB; 139/387 R, 389, 388

[56] References Cited

UNITED STATES PATENTS

| | | | |
|---|---|---|---|
| 2,773,285 | 12/1956 | Piazze | 150/1 |
| 2,998,340 | 8/1961 | Conway | 93/35 PT |
| 3,340,919 | 9/1967 | Holbrook | 139/389 |
| 3,360,014 | 12/1967 | Poisson | 139/389 |
| 3,451,693 | 6/1969 | Carey | 280/150 AB |
| 3,560,018 | 2/1971 | Goetz | 280/150 AB |
| 3,738,681 | 6/1973 | Wada | 280/150 AB |
| 3,801,123 | 4/1974 | Jira | 280/150 AB |
| 3,810,654 | 5/1974 | Debano | 280/150 AB |

*Primary Examiner*—Robert R. Song
*Assistant Examiner*—John P. Silverstrim
*Attorney, Agent, or Firm*—Robert E. Burns; Emmanuel J. Lobato; Bruce L. Adams

[57] ABSTRACT

An inflatable protector bag of a vehicle safety device for protecting a vehicle occupant during a collision by the vehicle. The protective bag has a collapsed inoperative condition and an expanded operative condition having when unloaded, a generally hexahedral configuration consisting of two rectangular sheet sections, two isosceles triangular sheet sections and two congruent scalene quadrilateral sheet sections. The protector bag is produced from a totally closed hollow rectangular confinement having a pair of flat coextensively overlapping sheet sections such that three triangular pocket portions are formed at three of the vertices of the rectangular confinement and are sealed along the respective bases of the triangular pocket portions.

6 Claims, 6 Drawing Figures

36 ← 38 + 40 + 42 + 44 + 46 + 48

U.S. Patent  Jan. 18, 1977  4,003,588
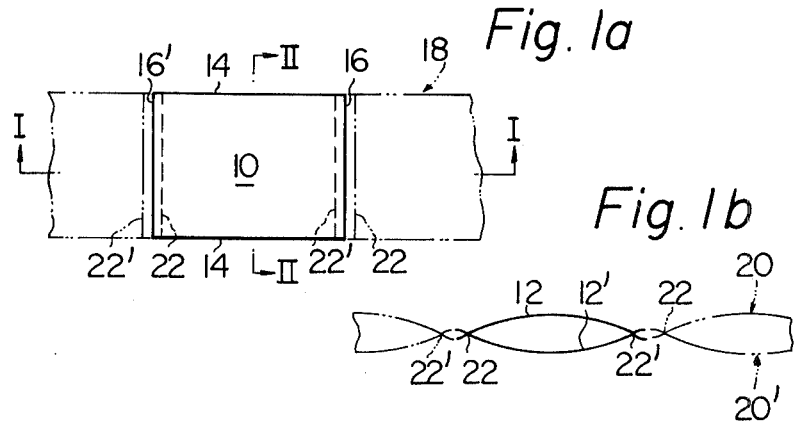
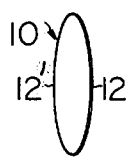
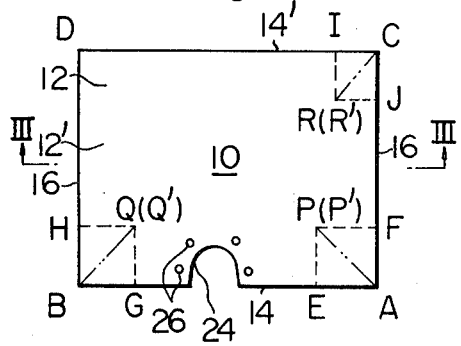
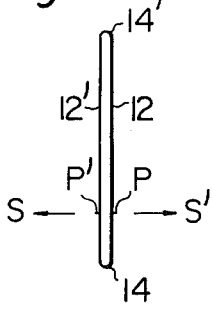
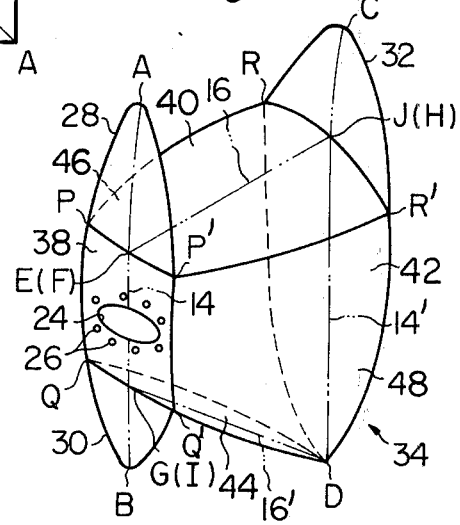
36 ← 38+40+42+44+46+48

INFLATABLE PROTECTOR BAG OR VEHICLE SAFETY DEVICE

BACKGROUND OF THE INVENTION

The present invention relates to vehicle safety devices and more particularly to a vehicle safety device of the type which uses a protector bag which is adapted to be inflated by gas under pressure in response to a collision condition encountered by the vehicle equipped with the device. The protector bag is moved, while being expanded, into a protective position intervening between a structural part of the vehicle, such as for example the windshield, the instrument panel or the steering wheel and the vehicle occupant who is flung forward during a head-on collision of the vehicle. The safety device of the described character is, thus, useful for the protection of a vehicle occupant from injury during a collision, particularly a head-on collision, encountered by the vehicle and is for this reason installed in a number of vehicles such as passenger cars. The present invention is, more specifically, concerned with a protector bag for use in such a vehicle safety device and with a method of producing the novel protector bag proposed herein.

As is well known in the art, a compact configuration, ease of manufacture and a low production cost are among the most important design considerations of an inflatable confinement, let alone the reliability of operation such as the resistance to the pressure which is to be suddenly developed in the confinement during a collision condition. Prior art protector bags are, however, so formed that they have generally spherical or spheroidal shapes when expanded under unloaded conditions and, for this reason, the above-mentioned requirements have not been satisfactorily met because of the low production efficiency that has resulted from the specific configuration of the protector bags. A typical example of the prior art protector bags is produced from a pair of flat sheet materials of, usually, a woven fabric coated with a gas-impermeable resin. Congruent circular sections are cut from these sheet materials and are seamed or bonded together along their entire circumferences. When the protector bag thus produced is expanded to its full capacity, the bag has a generally spheroidal configuration having an equatorial circumference along its seam. A number of scraps or snippets of the blanks is thus produced after the circular sections are cut from the sheet materials which usually are rectangular. The scraps or snippets must be discarded as useless and give rise to a low production efficiency and a high production cost of the protector bag and accordingly the safety device using the protector bag. The time-consuming process to seam or bond the two circular sections together provides another cause of the low production efficiency and the high production cost. The present invention contemplates elimination of all these drawbacks that have been inherent in the prior art protector bags of the vehicle safety devices of the described character.

SUMMARY OF THE INVENTION

It is, therefore, an important object of the present invention to provide an improved protector bag having a configuration which can be manufactured economically and in simple steps without wasting materials.

It is another important object of the invention to provide an improved protector bag which can be collapsed compactly and which can be nevertheless reliably and rapidly expanded into a protective condition when inflated with a gas under pressure.

Yet, it is another important object to provide a simple and economical method of producing the protector bag having the above-mentioned advantages.

In accordance with one aspect of the present invention, there is provided a protector bag which is formed of yielding and gas-impermeable material and has a collapsed inoperative condition and an expanded and unloaded operative condition having, when unloaded, a generally hexahedral configuration which consists of a first rectangular sheet section having first and second pairs of parallel sides, a second rectangular sheet section substantially normal to the first rectangular sheet section and having first and second parallel sides, one of the first pair of parallel sides of the second rectangular sheet section being common to one of the first pair of parallel sides of the first rectangular sheet sections, a first substantially isosceles triangular sheet section opposite to the first rectangular sheet section and having a base common to the other of the first pair of parallel sides of the second rectangular sheet section and substantially equilateral sides meeting at a vertex, a second substantially isosceles triangular sheet section opposite to the second rectangular sheet section and having a base common to the other of the first pair of parallel sides of the first rectangular sheet section and substantially equilateral sides meeting each other at the above-mentioned vertex, and first and second substantially congruent, scalene quadrilateral sheet sections which are opposite to each other and which have respective first sides common to the second pair of parallel sides of the first rectangular sheet section, respective second sides common to the second pair of parallel sides of the second rectangular sheet section, respective third sides common to the equilateral sides of the first triangular sheet section and meeting each other at the above-mentioned vertex, and respective fourth sides common to the equilateral sides of the second triangular sheet section and meeting each other at the vertex.

In accordance with another aspect of the present invention, the inflatable protector bag having the features above described is produced in a method which comprises the steps of forming a totally closed hollow confinement consisting of a pair of substantially flat, coextensively overlapping, generally rectangular sheet sections, folding each of three corner portions of each of the sheet sections along the bisector of an angle of the corner portion for forming a total of three substantially isosceles triangular pocket portions each consisting of a pair of substantially flat, coextensively overlapping sheet sections which are integral with each other along their substantially equilateral sides and which have respective bases which are normal to the planes of the substantially flat overlapping sections of the initial confinement, and hermetically sealing each of the pocket portions along its base. Each of the above-mentioned three corner portions may be either concavely or convexly folded along the bisector of an angle of the corner portion so that each of the triangular pocket portions resulting therefrom is formed internally or externally, respectively, of the confinement. The pocket portions which are formed externally of the confinement may be bent from their respective bases and securely fastened to the outer face of the confinement or, as an alternative, may be removed from the confinement. The method may further comprise the step of forming an opening preferably in the above-mentioned first rectangular sheet section of the confinement so that communication is provided between the interior of the confinement and a normally inoperative source of gas under pressure.

BRIEF DESCRIPTION OF THE DRAWING

The features and advantages of the inflatable protector bag and the method to produce such a protector bag in accordance with the present invention will become more apparent from the following description taken in conjunction with the accompanying drawings, in which:

FIG. 1a is a top plan view showing a closed hollow confinement from which the protector bag according to the present invention is produced;

FIG. 1b is a section on line I—I of FIG. 1a;

FIG. 1c is a section on line II—II of FIG. 1a;

FIG. 2a is also a top plan view which shows, to an enlarged scale, the closed hollow confinement being processed to form the protector bag according to the present invention.

FIG. 2b is a section on line III—III of FIG. 2a; and

FIG. 3 is a perspective view which shows an expanded and unloaded condition of the protector bag which is produced from the confinement shown in FIGS. 2a and 2b.

DESCRIPTION OF THE PREFERRED EMBODIMENTS

Referring to the drawings, first particularly to FIGS. 1a, 1b and 1c thereof, a vehicle occupant protector bag embodying the present invention is produced from a totally closed hollow confinement 10 comprised of a pair of substantially flat, coextensively overlapping, generally rectangular sheet sections 12 and 12' which are hermetically joined together along the four closed edges of the confinement 10. For the sake of clarity of description to follow, it is herein assumed that the four closed edges of the hollow confinement 10 consist of a first paid of closed parallel edges 14 and 14' and a second pair of closed parallel edges 16 and 16' which are perpendicular to the first pair of closed parallel edges 14 and 14', as indicated in FIG. 1a. The closed hollow confinement 10 is formed of a yielding, gas-permeable material such as for example a sheet of cloth coated with a gas-impermeable resin and is preferably produced from a continuous elongate blank 18 comprised of a pair of elongate, coextensively overlapping strips 20 and 20' as indicated by phantom lines in FIGS. 1a and 1b. The elongate, coextensively overlapping strips 20 and 20' are interwoven or otherwise integrally conjoined together along their common longitudinal ends which will form the above-mentioned first pair of closed parallel edges 14 and 14' of the confinement 10. The elongated strips 20 and 20' of the blank 18 which is thus initially of a generally tubular form are then laterally seamed, bonded or otherwise hermetically joined together along pluralities of pairs of spaced parallel lateral lines 22 and 22' which are located on both sides of each of the previously mentioned second pair of closed parallel edges 16 and 16' of the confinement 10 which will be formed from the elongate blank 18. The individual pairs of lateral lines 22 and 22' are preferably located at substantially regular intervals each of which is largely equal to the length of the resultant confinement 10, viz., the distance between the second pair of closed parallel edges 16 and 16' of the confinement 10 which will be formed. The continuous elongate blank 18 is consequently formed with a plurality of totally closed sections which are joined in succession to one another through lateral areas defined by the seamed, bonded or otherwise conjoined lateral lines 22 and 22'. The blank 18 thus arranged is then cut along lines each intervening between each of the pairs of lateral lines 22 and 22' so that a number of totally closed hollow confinements 10 are produced from the single elongate blank 18. Each of the hollow confinements 10 produced in this manner has the previously mentioned first pair of closed parallel edges 14 and 14' resulting from the longitudinal ends of the initial blank 18 and the previously mentioned second pair of closed parallel edges 16 and 16' extending in close proximity to the seamed, bonded or otherwise joined lines 22 and 22' of the initial blank 18. The above described method of producing the hollow confinement 10 is suitable for the manufacture of the protector bags embodying the present invention on a large-scale commercial basis. Such a method is, however, merely by way of example and, thus, the totally closed hollow confinement 10 to produce the protector bag embodying the present invention may be produced in any other method if desired.

The totally closed hollow confinements 10 thus produced is then punched out or cut by heat for forming therein an opening 24 as illustrated in FIG. 2a. The opening 24 is shown, by way of example, to extend inboardly and substantially perpendicularly from the initially closed edge 14 of the confinement 10 and to consist of generally semi-circular halves which are respectively formed in the two sheet sections 12 and 12' of the confinement 10 and which are substantially coextensive with each other. The opening 24 arranged in such a manner may be readily formed by punching out or heat cutting portions of the sheet sections 12 and 12' of the confinement 10 with the sheet sections 12 and 12' closely superposed upon each other. The opening 24 thus formed in the confinement 10 is intended to provide communication therethrough between the interior of the protector bag being produced from the confinement 10 and a normally closed or inactive source (not shown) of a pressurized gas direction into the protector bag when the pressurized gas source is actuated in response to a collision condition encountered by the vehicle. Though not shown, such a gas source usually includes a normally closed container filled with gas under pressure or an explosive charge which is adapted to generate gas under pressure when fired. The location and/or the configuration of the opening 24 shown and described herein may therefore be changed as desired, depending upon the conditions in which the protector bag being produced from the confinement 10 will be stowed and the conditions in which the protector bag will be expanded into a protective position.

The confinement 10 is further formed with a plurality of small holes 26 through which the confinement 10 will be securely fastened by means of bolts, studs or the like to a rigid support member (not shown) to which the protector bag will be retained. The holes 26 are herein shown as being located around the above-mentioned opening 24 but they may be otherwise located in the confinement 10 if desired. The holes 26 may also be formed by punching or heat cutting the confinement 10 with the two sheet sections 12 and 12' of the confinement superposed upon each other.

The hollow confinement which is now open through the opening 24 and the holes 26 is deformed into a bag from in the following steps.

1. For ease of discussion, the four vertices of the rectangular confinement 10 are denoted by A, B, C and D at which the edges 14 and 16, the edges 14 and 16', the edges 14' and 16 and the edges 14' and 16' are assumed to perpendicularly meet each other respectively. A set of three given points P, Q and R is marked or otherwise indexed on the outer face of one sheet section 12 of the confinement 10 in the vicinity of the vertices A, B and C, respectively, of the confinement 10 and similarly a set of three given points P', Q' and R' is marked or otherwise indexed on the outer face of the other sheet section 12' of the confinement 10 in the vicinity of the vertices A, B and C, respectively, of the confinement 10. As is illustrated in FIG. 2a, the points P and P' on the sheet sections 12 and 12' of the confinement 10 are found on the bisectors of an angle of respective corner portions of the sheet sections at the vertex A and are located at substantially equal distances from the vertex A. Likewise, the points Q and Q' on the sheet sections 12 and 12' are found on the bisectors of an angle of respective corner portions of the sheet sections at the vertex B of the confinement 10 and are located at substantially equal distances from the vertex B, and the point R and R' are found on the bisectors of an angle of corner portions of the sheet sections 12 and 12' at the vertex C of the confinement 10 and are located at substantially equal distances from the vertex C. Corner portions of the sheet sections 12 and 12' at the vertex D of the confinement 10 is preferably left plain. The lengths of the line segments A-P and A-P', the lengths of the line segments B-Q and B-Q', and/or the lengths of the line segments C-R and C-R' thus constructed may be equal to or different from each other. In FIG. 2, the lengths of the line segments A-P and A-P' and the line segments B-Q and B-Q' are assumed to be substantially equal to each other and greater than the lengths of the line segments C-R and C-R'. Lines are then drawn perpendicularly from each of the thus marked or otherwise indexed points, P, P', Q, Q', R and R' to the perpendicularly meeting edges of the confinement 10 defining the corner portion on which the particularly given point is located. If, in this instance, the feet of the perpendiculars on the edges 14 and 16 of the confinement 10 from the given points P and P' are denoted by E and F, respectively, the feet of the perpendiculars on the edges 14 and 16' from the given points Q and Q' are denoted by G and H, respectively, and the feet of the perpendiculars on the edges 14' and 16 are denoted by I and J, respectively, then three square-shaped corner areas A-E-P-F, B-H-Q-G and C-J-R-I are constructed in the three corner portions of the sheet section 12 of the confinement 10 and, likewise, three square-shaped corner areas A-E-P'-F, B-H-Q'-G and C-J-R'-I are constructed in the three corner portions of the sheet section 12' of the confinement 10. The square-shaped corner areas A-E-P-F, B-H-Q-G and C-J-R-I on the sheet section 12 are, apparently, in registry with the square-shaped corner areas A-E-P'-F, B-H-Q'-G and C-J-R'-I, respectively, on the sheet section 12'.

2. The sheet sections 12 and 12' of the confinement thus marked or otherwise indexed are then pinched at the points P, P40, Q, Q', R and R' and are spaced apart from each other in directions substantially normal to the initial flat sheet sections 12 and 12' as indicated by arrows S and S' in FIG. 2b in regard to the points P and P'. The corner portions of the sheet sections 12 and 12' in the vicinity of the vertices A, B and C of the confinement 10 are therefore convexly folded along the bisectors of angles of the corner portions with the result that the inner surfaces of the angularly bisected triangular sections of each of the square-shaped corner areas (e.g. the triangular sections A-E-P and A-F-P of the square-shaped corner area in the vicinity of the vertex A) of the sheet sections 12 and 12' are brought into angularly face-to-face relationship to each other. When the bisected triangular sections of each of the square-shaped corner portions of the sheet sections 12 and 12' thus spaced apart are brought into contact with each other, then the mutually aligned points P and P'; Q and Q'; and R and R' of the sheet sections 12 and 12' are located at distance each of which is substantially equal to the sum of the two perpendiculars drawn from each of the above-mentioned points, viz., two times as long as the extent of each of the perpendiculars drawn from each of the points. Under these conditions, the initially square-shaped corner portions of the sheet sections 12 and 12' of the confinement 10 in the vicinity of the vertices A, B and C are deformed so as to form isosceles triangular pocket portions 28, 30 and 32, respectively, as shown in FIG. 3. Referring to FIG. 3 as well as to FIGS. 2a and 2b each of the pocket portions 28, 30 and 32 has equilateral sides which have resulted from the diagonal lines or bisectors of angles of the square-shaped corner areas of the initial sheet section 12 and 12' in the vicinity of each of the vertices A, B and C of the confinement 10. For example, the triangular pocket portion 28 formed in the vicinity of the vertex A of the initial confinement 10 has equilateral sides which have resulted from the line segments A-P and A-P' angularly bisecting the square-shaped corner areas A-E-P-F and A-E-P'-F of the sheet sections 12 and 12' of the initial confinement 10. Each of the pocket portions 28, 30 and 32 shown in FIG. 3 is, furthermore, comprised of a pair of coextensively overlapping, substantially isosceles triangular sections which are joined together by the above-mentioned equilateral sides of the pocket portion and which have respective bases each of which has resulted from the perpendiculars having a common foot on the edge of the initial confinement 10. For example, the triangular pocket portion 28 is made up of a pair of overlapping sections which are joined together through the above-mentioned line segments A-P and A-P' of the initial sheet sections 12 and 12' and which have respective bases one of which has resulted from the perpendiculars P-E and P'-E on the initial sheet sections 12 and 12', respectively, of the confinement 10 and the other of which has resulted from the perpendiculars P-F and P'-F on the initial sheet sections 12 and 12'. The lines A-E and A-F which have been on the sides of the square-shaped corner areas A-E-P-F and A-E-P'-F of the initial sheet sections 12 and 12' now construct bisectors of an angle between the equilateral sides of the triangular sections of the pocket portion 28 and are substantially in registry with each other with the points E and F located at the middle between the points P and P'. The sizes of the triangular pocket portions 28, 30 and 32, particularly the extents of the respective bases P-P', Q-Q' and R-R' of the pocket portions 28, 30 and 32 depend upon the distances at which the points P, Q and R and the points P', Q' and R' are respectively spaced apart from the perpendicularly meeting edges of the sheet sections 12 and 12' of the initial confinement 10. The above described triangular pocket portions 28, 30 and 32 may be formed one after another and, in this instance, it is preferable that each of the pocket portions 28, 30 and 32 be temporarily retained in the triangularly folded condition thereof by stapling or otherwise releasably fastening the overlapping sections of the pocket portion before another pocket portion will be formed.

3. The overlapping sections of each of the isosceles triangular pocket portions 28, 30 and 32 are seamed, bonded or otherwise hermetically sealed off to each other along each of the base lines P-P', Q-Q' and R-R' of the pocket portions 28, 30 and 32. The initially flat rectangular hollow confinement 10 is in this manner deformed into a protector bag 34 having a main body portion 36 carrying thereon the three triangular pocket portions 28, 30 and 32.

As will be understood from the foregoing description, especially from the illustration of FIG. 3, the protector bag 34 embodying the present invention or, more particularly, the main body portion 36 of the protector bag 34 has in its fully expanded and unloaded condition a generally hexahedral configuration consisting of a first rectangular sheet section 38 formed with the previously mentioned opening 24 and holes 26 and having a first pair of parallel sides P-P' and Q-Q' and a second pair of parallel sides P-Q and P'-Q', a second rectangular sheet section 40 substantially normal to the first rectangular sheet section 38 and having a first pair of parallel sides P-P' and R-R' and a second pair of parallel sides P-R and P'-R', a first isosceles triangular sheet section 42 opposite to the first triangular sheet section 38 and having a base R-R' and equilateral sides R-D and R'-D meeting each other at the vertex D of the initial confinement 10, a second isosceles triangular sheet section 44 opposite to the second rectangular sheet section 40 and having a base Q-Q' and equilateral sides Q-D and Q'-D meeting each other at the above-mentioned vertex D, and first and second congruent, scalene quadrilateral sheet sections 46 and 48 which are opposite to each other and which meet each other at the vertex D, the first and second quadrilateral sheet sections 46 and 48 having respective first sides P-Q and P'-Q', respective second sides P-R and P'-R', respective third sides Q-D and Q'-D, and respective fourth sides R-D and R'-D.

The protector bag 34 thus configured is bolted or otherwise securely fastened to a suitable support member such as for example the instrument panel, the steering wheel or, for the protection of an occupant of the rear seat of the vehicle, the back of the front seat through the holes 26 in such a manner that communication is provided between the interior of the protector bag 34 and a normally inoperative source of gas under pressure through the opening 24 in the above-mentioned first rectangular section 38 of the body portion 36, though not shown in the drawings. The protector bag 34 is normally stowed in a collapsed or compact condition within the above-mentioned support member and is expanded into the protective condition illustrated in FIG. 3 when the source of the gas under pressure is actuated in response to a collision encountered by the vehicle. The protector bag 34 having the configuration illustrated is thus adapted to have its first triangular sheet section 42 first brought into contact with the occupant's body and restrains the occupant from being forcefully flung forward in the event of a head-on collision. The expanded protector bag 34 is forcibly compressed by the forward movement of the occupant caught by the protector bag and will be deformed into a complex configuration having its surface portions pressed against various parts of the vehicle and of the occupant. Under these conditions, the generally pyramid-shaped lower-most portion of the protector bag 34 in the vicinity of the vertex D will be forced against the abdominal part of the occupant and, for this reason, the protector bag 34 is capable of restraining the occupant approximately over the whole front area of the occupant's upper body.

The triangular pocket portions 28, 30 and 32 of the protector bag 34 shown in FIG. 3 scarcely affect the protective performance of the protector bag 34 and may therefore be left attached to the main body portion 36 of the protector bag 34. If desired, however, the pocket portions 28, 30 and 32 or at least one or two thereof may be bent from their respective bases and bonded or otherwise securely attached to the outer face of the body portion 36 or, as an alternative, may be removed from the body portion 36. While, furthermore, the pocket portions 28, 30 and 32 have been described as being formed externally of the body portion 36 with the previously mentioned square-shaped corner portions of the sheet sections 12 and 12' of the initial confinement 10 convexly folded, the square-shaped corner portions of the initial sheet sections 12 and 12' may be concavely folded so that the isosceles triangular pocket portions 28, 30 and 32 each having a pair of overlapping sections are formed internally of the confinement 10 or the protector bag 34 produced from the confinement 10, though not illustrated in the drawings.

What is claimed is:

1. An inflatable protector bag of a vehicle safety device for protecting a vehicle occupant during a collision of the vehicle, formed of a yielding and gas-impermeable material and having a collapsed inoperative condition and an expanded and unloaded operative condition having, when unloaded, a generally hexahedral configuration which consists of a first rectangular sheet section having first and second pairs of parallel sides, a second rectangular sheet section substantially normal to said first rectangular sheet section and having first and second pairs of parallel sides, one of the first pair of parallel sides of the second rectangular sheet section being common to one side of the first of parallel sides of said first rectangular sheet sections, a first substantially isosceles triangular sheet section opposite to said first rectangular sheet section and having a base common to the other side of said first pair of parallel sides of said second rectangular sheet section and substantially equilateral sides meeting at a vertex, a second substantially isosceles triangular sheet section opposite to said second rectangular sheet section and having a base common to the other side of said first pair of parallel sides of said first rectangular sheet section and substantially equilateral sides meeting each other at said vertex, and first and second substantially congruent, scalene quadrilateral sheet sections which are opposite to each other and which have respective first sides common to said second pair of parallel sides of said firt rectangular sheet section, respective second sides common to said second pair of parallel sides of said second rectangular sheet section, respective third sides common to said equilateral sides of said first triangular sheet section and meeting each other at said vertex, and respective fourth sides common to said equilateral sides of said second triangular sheet section and meeting each other at said vertex.

2. An inflatable protector bag as set forth in claim 1, in which said first rectangular sheet section is formed with an opening through which gas under pressure is directed into the interior of the protector bag for expanding the bag in response to a collision encountered by the vehicle.

3. An inflatable protector bag as set forth in claim 1, comprising first, second and third substantially isosceles triangular pocket portions each consisting of coextensively overlapping sheet sections which are integrally joined together along their equilateral sides and which have respective bases hermetically sealed together, the first triangular pocket portion having a base common to the side common to said first and second rectangular sheet sections, the second triangular pocket portion having a base common to the side common to said first rectangular sheet section and said second triangular sheet section, and the third triangular pocket portion having a base common to the side common to said second rectangular sheet section and said first triangular sheet section.

4. An inflatable protector bag as set forth in claim 3, in which each of said pocket portions is disposed internally of the protector bag.

5. An inflatable protector bag as set forth in claim 3, in which each of said pocket portions is disposed externally of the protector bag.

6. An inflatable protector bag as set forth in claim 5, in which each of said pocket portions is bent from its base and securely attached to the outer face of one of the sheet sections to which the pocket portion is joined.

* * * * *